United States Patent
Lee (10) Patent No.: US 9,452,896 B2
(45) Date of Patent: Sep. 27, 2016

(54) POP-UP CONVEYOR TRANSFER SYSTEM

(71) Applicant: Laitram, L.L.C., Harahan, LA (US)

(72) Inventor: Brian R. Lee, Kenner, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/496,462

(22) Filed: Sep. 25, 2014

(65) Prior Publication Data

US 2016/0090246 A1 Mar. 31, 2016

(51) Int. Cl.
*B65G 47/66* (2006.01)
*B65G 37/00* (2006.01)

(52) U.S. Cl.
CPC ............... *B65G 47/66* (2013.01); *B65G 37/00* (2013.01)

(58) Field of Classification Search
CPC .............................. B65G 47/66; B65G 37/005
USPC ....... 198/539, 599, 600, 604, 605; 193/35 G
See application file for complete search history.

(56) References Cited

U.S. PATENT DOCUMENTS

| | | | |
|---|---|---|---|
| 2,624,444 A | 1/1953 | Casabona | |
| 4,288,208 A * | 9/1981 | Kusters | B27N 3/16 198/493 |
| 4,613,036 A | 9/1986 | Bourgeois | |
| 5,215,182 A * | 6/1993 | Garbagnati | B65G 47/66 198/325 |
| 5,228,554 A * | 7/1993 | Kuchta | B26D 7/0675 198/635 |
| 5,322,158 A | 6/1994 | Borsboom et al. | |
| 5,597,062 A | 1/1997 | Biwer | |
| 5,634,550 A * | 6/1997 | Ensch | B65G 17/08 198/457.05 |
| 5,908,104 A * | 6/1999 | Brun-Jarret | B66B 29/08 193/35 R |
| 5,971,129 A * | 10/1999 | Stawniak | B66B 29/08 198/324 |
| 6,068,107 A | 5/2000 | Brun-Jarret | |
| 6,164,435 A | 12/2000 | Coen et al. | |
| 6,296,110 B1 | 10/2001 | van Zijderveld et al. | |
| 7,210,569 B1 * | 5/2007 | Tarhan | B65G 47/66 198/599 |
| 7,413,088 B2 * | 8/2008 | Temler | B07B 13/04 209/521 |
| 7,506,750 B2 | 3/2009 | Costanzo et al. | |
| 8,210,341 B2 | 7/2012 | Marshall et al. | |
| 8,567,591 B2 * | 10/2013 | Gonzalez Alemany | B66B 23/00 198/324 |
| 8,978,871 B1 * | 3/2015 | Guider | B65G 67/08 198/456 |

(Continued)

FOREIGN PATENT DOCUMENTS

JP 05-193728 A 8/1993
JP 2008-222390 A 9/2008

OTHER PUBLICATIONS

International Search Report and Written Opinion of the International Searching Authority, PCT/US2015/046124, mailed Nov. 6, 2015, Korean Intellectual Property Office, Republic of Korea.

*Primary Examiner* — Douglas Hess
(74) *Attorney, Agent, or Firm* — James T. Cronvich (57) ABSTRACT

A conveyor system with a pop-up transfer assembly for transferring articles off the end of conveyor belt having protrusions extending above the belt's outer conveying surface. The transfer assembly is cantilevered over the reversing path of the conveyor belt from a pivot. When a protrusion from the belt hits the transfer assembly, the transfer assembly pivots away from the belt about the pivot. When the protrusion is clear, the transfer assembly drops, by gravity, back to its home position proximate the belt. A bilateral transfer assembly is cantilevered in opposite directions to transfer articles off the end of one conveyor belt onto another conveyor belt that may or may not have protrusions.

28 Claims, 5 Drawing Sheets

(56) References Cited

U.S. PATENT DOCUMENTS

| | | | |
|---|---|---|---|
| 9,027,738 B2* | 5/2015 | Coen | B65G 47/66 198/539 |
| 2005/0173858 A1 | 8/2005 | Temler et al. | |
| 2010/0108467 A1 | 5/2010 | Barreyre et al. | |
| 2013/0248322 A1 | 9/2013 | Okamoto et al. | |
| 2014/0008178 A1 | 1/2014 | Guernsey et al. | |
| 2014/0332342 A1 | 11/2014 | Guernsey et al. | |

* cited by examiner

POP-UP CONVEYOR TRANSFER SYSTEM

BACKGROUND

The invention relates generally to power-driven conveyors and more particularly to conveyor systems with pop-up transfer platforms between two end-to-end conveyors.

Shoe sorters are used to divert articles, such as trays or packages, across the conveying surface of a conveyor belt. Shoes riding with the belt move laterally across the width of the belt to push articles off the side or to register them at predetermined positions. The shoes extend from the belt above the conveying surface. Because the shoes protrude above the conveying surface, they require clearance at the end of the belt's carryway run to make their way around drive or idle sprockets. When a conveyor belt is used to feed articles off its end and onto another conveyor, a stationary transfer plate positioned in the space between the two conveyors is commonly used. To prevent articles from tipping over as they enter and exit the transfer plate, especially articles with small footprints or bottom features, the gaps between the transfer plate and the conveyors must be small. But if the shoes of a shoe sorter are not moved to known positions across the width of the belt where clearance is provided by the transfer plate, the shoes will hit the transfer plate and cause damage. In fact, any belt having protrusions, such as flights, is subject to interference by a transfer plate positioned too close to the belt.

SUMMARY

One version of a transfer assembly embodying features of the invention for transferring articles off the end of a conveyor comprises a first side rail and a second side rail, which each include a pivot portion having a bore and a finger extending from the pivot portion to a distal tip. The bores through the first and second side rails are aligned along a pivot axis to receive a shaft. A connecting member is connected between the first and second side rails so that the first and second side rails pivot together about the pivot axis.

Another version of a transfer assembly comprises a first pivot portion having a bore and a first cantilevered portion extending from the first pivot portion to a distal tip. A shaft extends through the bore and has a diameter less than the diameter of the bore. The shaft defines a pivot axis about which the first pivot portion and the first cantilevered portion can pivot freely away from a home position when the tip is subjected to an upward force and back to the home position by gravity when the tip is not subjected to an upward force.

In another aspect of the invention, a conveyor system comprises an endless first conveyor belt advancing in a conveying direction along an upper carryway and rounding a reversing element along a reversing path at an exit end of the first conveyor belt into a lower return path. The first conveyor belt has an outer conveying side with protrusions extending outward of the outer conveying side. A transfer assembly disposed at the exit end of the first conveyor belt receives articles exiting the conveyor belt. The transfer assembly includes a pivot portion having a bore and a cantilevered portion that extends from the pivot portion over the reversing element to a distal tip. A shaft extending through the bore defines a pivot axis perpendicular to the conveying direction about which the pivot portion and the cantilevered portion can pivot away from the first conveyor belt by contact with the protrusions on the reversing path and back toward the first conveyor belt by gravity when not in contact with the protrusions.

DETAILED DESCRIPTION

Figure 1A:
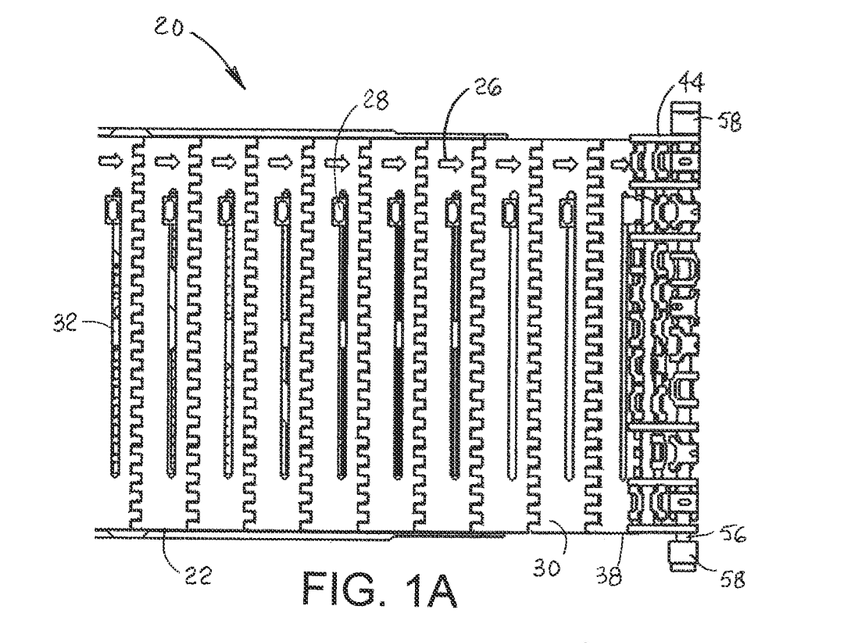
FIGS. 1A and 1B are top plan and side elevation views of a portion of a conveyor system embodying features of the invention.
Figure 1B:
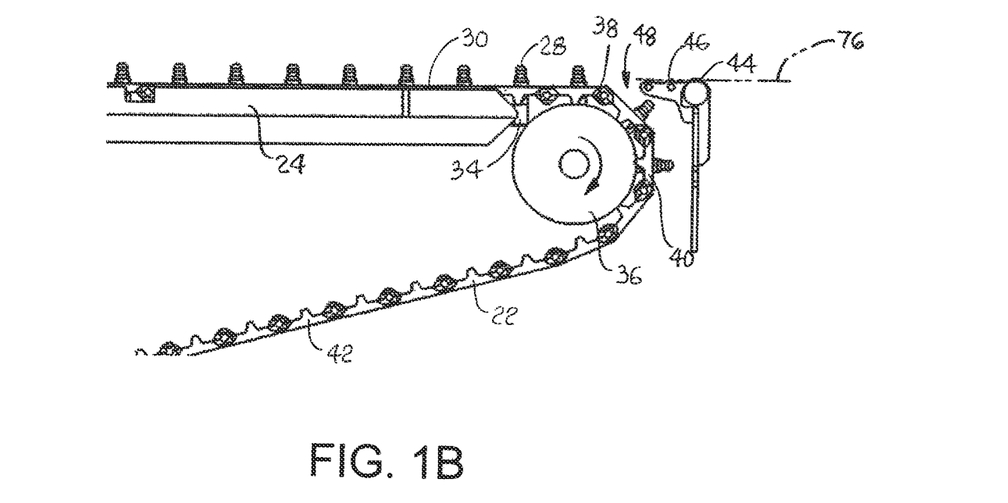

FIGS. 1A and 1B show a portion of a conveyor system embodying features of the invention. The conveying system 20 includes a conveyor belt 22 advancing along a carryway 24 in a conveying direction 26. Protrusions 28 extend outward of an outer conveying surface 30 of the belt 22. In this example, the protrusions 28 are pusher elements that ride along tracks 32 that extend across the width of the conveyor belt 22. Guides (not shown) underlying the belt engage cam followers 34 depending from the pusher elements 28 to guide them across the belt 22 as it advances in the conveying direction 26. Instead of pusher elements, the protrusions could be flights, lane dividers, or any other structure extending upward from a belt's outer conveying surface. The belt 22 departs from the carryway 24 around a reversing element 36, such as drive or idle sprockets, at an exit end 38 of the belt. After following a reversing path 40 around the reversing element, the endless conveyor belt 22 returns in a returnway along a return path 42. Articles not diverted off the belt 22 by the pusher elements 28 transfer off the exit end 38 of the belt onto a transfer assembly 44, whose uppermost surfaces 46 are generally coplanar with the outer conveying surface 30 of the belt on the carryway 24. The transfer assembly 44 is cantilevered over the belt on the reversing element 36 with a small gap 48 between the exit end 38 of the belt and the transfer assembly for a smooth transfer.

Figure 2:
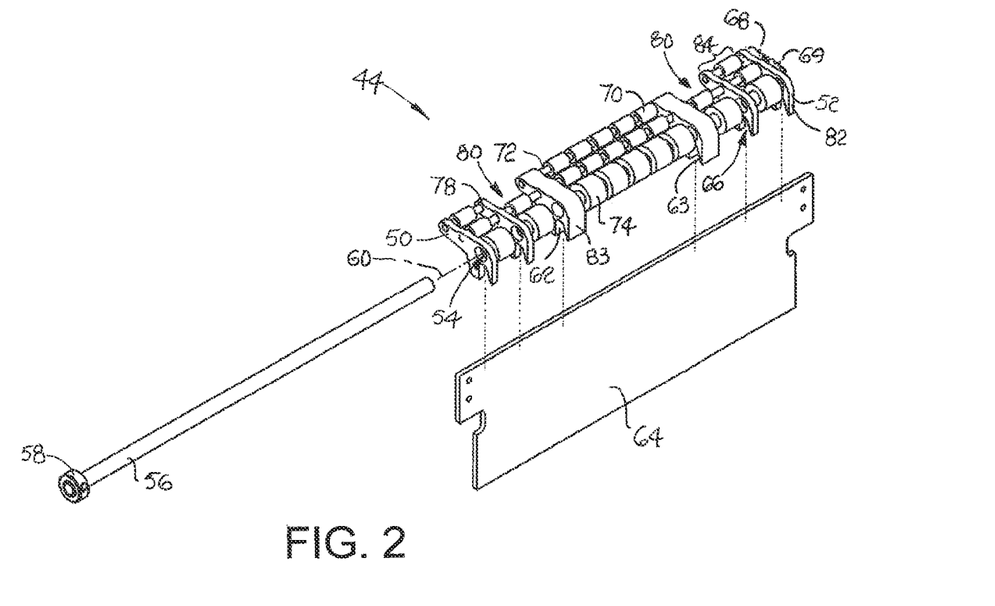
FIG. 2 is an exploded view of the transfer assembly of the conveyor system of FIGS. 1A and 1B.

The transfer assembly 44 is shown in more detail in FIG. 2. The transfer assembly has a cantilevered portion 50 extending outward from a pivot portion 52. A bore 54 extends laterally through the pivot portion 52. A shaft 56 extends through the bore 54. The shaft 56 is supported at opposite ends in the conveyor frame. The shaft 56 is shown in FIGS. 1A and 2 mounted in bearing blocks 58 so that it can rotate, but it could be affixed at both ends so as not to rotate. In this example, the inner diameter of the bore 54 is greater than the outer diameter of the shaft 56 so that the transfer assembly 44 can rotate about a pivot axis 60 defined by the shaft 56 perpendicular to the conveying direction 26. Stop faces 62, 63 on the transfer assembly 44 operate in conjunction with a fixed stop, such as a stationary plate 64, that extends into a space 66 between the stops to limit the angular pivot range of the transfer assembly about the pivot axis.

As shown in FIG. 2, the transfer assembly 44 includes two rows 68, 69 of small-diameter rollers 70 mounted on connecting members 72 in the form of connecting pins parallel to the pivot axis 60. Large rollers 74 are mounted on the pivot shaft 56. The bore 54 is below the level of the connecting pins 72 so that the large rollers and the small rollers have a common tangent plane 76, as shown in FIG. 1B. The tangent plane 76 is generally coplanar with the outer conveying surface 30 of the conveyor belt 22. Articles transferring off the exit end 38 of the conveyor belt 22 ride across the freely rotatable rollers 70, 74 in the transfer assembly 44. The first row 68 of rollers 70 is positioned close to a distal tip end 78 of the cantilevered position 50, as shown in FIG. 2. The second row 69 of small rollers 70 is positioned between the first row 68 and the row of large rollers 74 on the pivot shaft 56. The first row 68 of rollers 70 is shown interrupted by spaces 80 at predetermined positions across the width of the transfer assembly 44. The spaces define vacant roller positions in the first row 68 that provide clearance for the belt's protrusions 28 when they are positioned to pass through the openings as the belt 22 enters the reversing path 40 around the reversing element 36. But if the protrusions 28 are not in these positions, they encounter the distal tips 78 of the transfer assembly 44.

As shown in FIG. 2, the transfer assembly 44 comprises a series of laterally spaced apart side rails: thin rails 82 and thick rails 83. The connecting members 72 connect consecutive side rails 82, 83 so that consecutive side rails pivot together about the pivot axis 60. In the example shown, the connecting members 72 are the connecting pins on which the small-diameter rollers 70 are mounted. Pairs of consecutive side rails 82, 83 form cradles or carriers 84 for the rollers. Each carrier can support one or more small rollers 70 on each connecting pin 72 and one or more large rollers on the portion of the shaft 56 between the carrier's side rails.

Figure 3A:
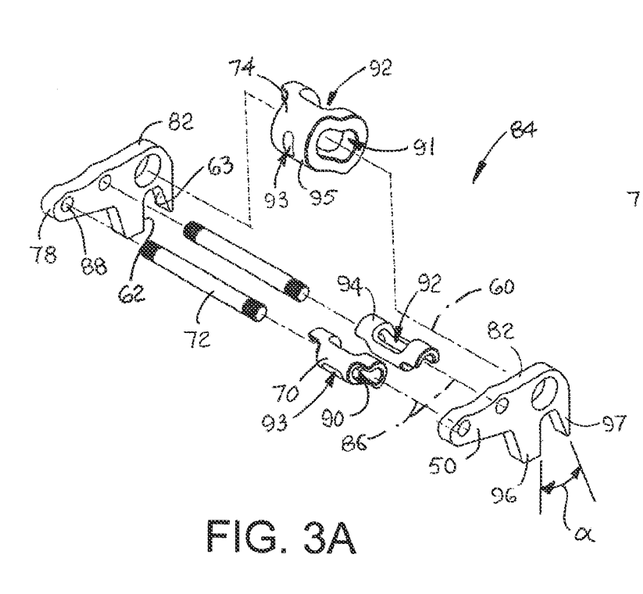
FIGS. 3A and 3B are exploded and isometric views of a portion of the transfer assembly of FIG. 2.
Figure 3B:
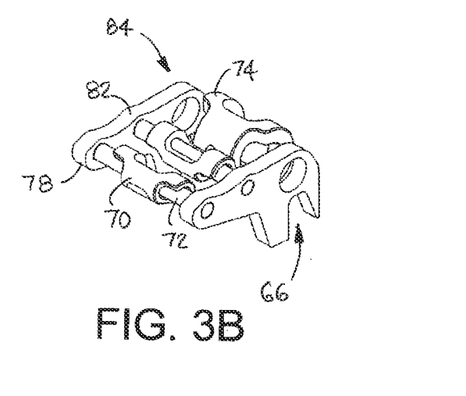

One of the carriers 84 is shown in more detail in FIGS. 3A and 3B. The carrier 84 in this example has only one small roller 70 on each pin 72 and only one large roller 74 for mounting on the pivot shaft. The cantilevered fingers 50 extend outward from the pivot portions 52 of the side rails 82. The fingers terminate in the curved distal finger tips 78. The small rollers 70 are mounted on the connecting pins 72 for free rotation about the axes 86 of the pins, which are parallel to the pivot axis 60. The ends of the pins 72 are knurled and press-fitted into cavities 88 in the side rails 82. The small and large rollers 70, 74 have central bores 90, 91 that receive the pins 72 or the shaft 56. Openings 92, 93 in the peripheries 94, 95 of the rollers extend to the central bores 90, 91 to improve the cleanability of the rollers. Besides exposing more of the bore and the pins and the shaft, the radial surfaces of the openings 92, 93 act like the vanes of a water wheel and cause the rollers to rotate when subjected to a stream of water or cleaning fluid. The rotation of the rollers further exposes the pins and shafts to the cleaning fluid. Two tabs 96, 97 depend downward from each side rail 82. The tabs have two confronting stop faces 62, 63 separated by the space 66. The stop faces 62, 63 are formed along radial extensions from the pivot axis 60 and define an angular pivot range a of the carrier 84 about its pivot axis 60. The angular pivot range a shown in FIG. 3A is only approximate because it does not account for the thickness of the fixed plate 64, which decreases the actual pivot range of the carrier 84, as better shown in FIG. 4C.

Figure 4A:
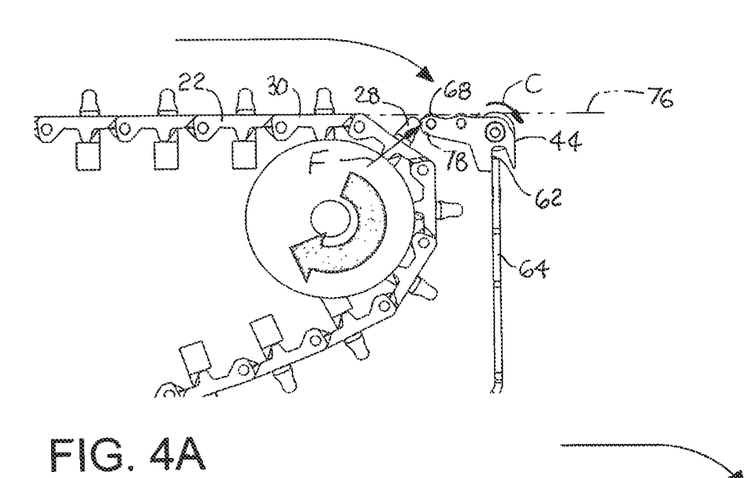
FIGS. 4A-4C are sequential side elevation views of the transfer assembly of FIG. 2 shown popping up upon contact with a belt protrusion and returning to a home position.
Figure 4B:
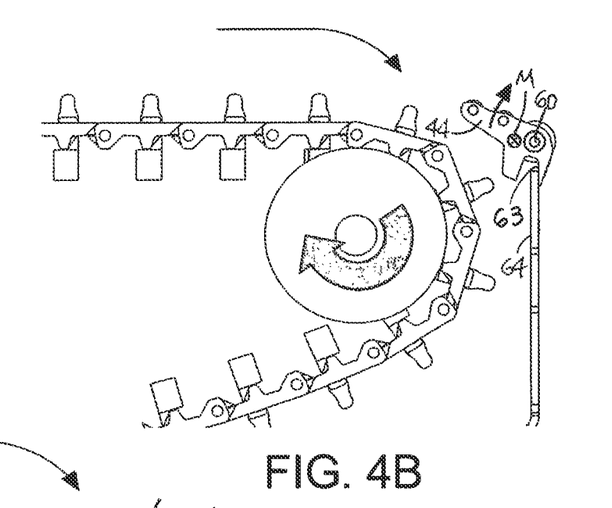
Figure 4C:
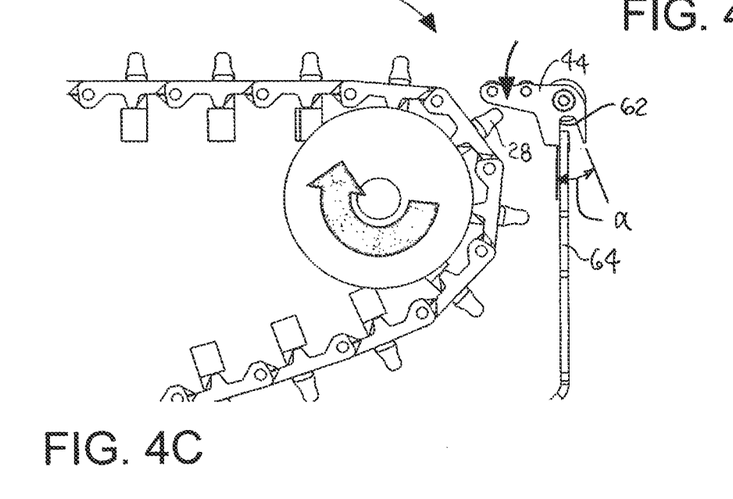

When a belt protrusion 28 is not aligned with one of the vacant roller spaces 80 as it starts to round the reversing element 36, it hits the distal tip 78 or the first row of rollers 68 of the transfer assembly 44, as shown in FIG. 4A. Contact between the protrusion 28 and the curved distal tip 78 of the transfer assembly 44 exerts a force F against the tip. The force F has an upward component that produces a couple C about the pivot axis that pivots the transfer assembly 44 clockwise from a home position shown in FIG. 4A with the first stop face 62 against the stop 64 to a popped-up position in which the first stop face is out of contact with the stop. FIG. 4B shows the transfer assembly 44 pivoted to a maximally pivoted popped-up position in which the second stop face 63 contacts the fixed stop 64. The stop 64 is attached to the conveyor frame at a fixed position relative to the stop faces 62, 63 so that the tangent plane 76 of the rollers 70, 74 is generally coplanar with the outer conveying surface 30 of the belt when the transfer assembly is in the home position (FIG. 4A). When the transfer assembly 44 is at the maximally popped-up position with the second stop face 63 contacting the stop 64, the center of mass M of the pivoting portion of the transfer assembly is on the belt side of the pivot axis 60 (FIG. 4B). In this way the transfer assembly can pivot counterclockwise, as in FIG. 4C, in the absence of an upward component of force from a protrusion and by the force of gravity back to the home position with the first stop face 62 in contact with the stationary stop 64. Thus, the transfer assembly pops up out of the way of the protrusions 28 as soon as they hit and returns home as soon as they pass.

Figure 5A:
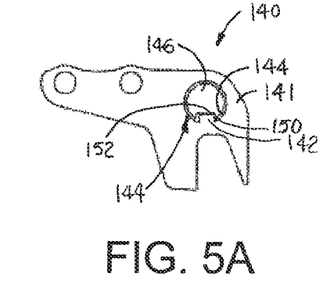
FIGS. 5A and 5B are side elevation views of another version of transfer assembly embodying features of the invention including a grooved-shaft stop mechanism and shown in home and popped-up positions.
Figure 5B:
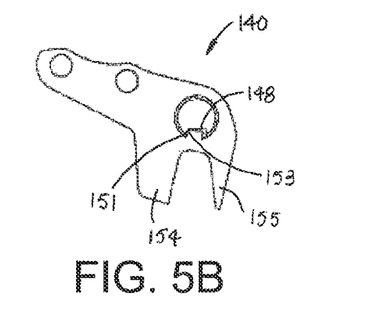

FIGS. 5A and 5B show another version of a transfer assembly in home and maximally popped-up positions. The transfer assembly 140 has a pivot portion 141 with a tab 142 that extends into the pivot bore 144 from a bore wall 144. A pivot shaft 146 received in the bore 144 has a groove 148 that accommodates the tab 142. A trailing stop face 150 at one end of the tab 142 contacts an aft end face 152 of the groove 148 to define the home position of the transfer assembly as shown in FIG. 5A. A leading stop face 151 at the other end of the tab 142 contacts a forward end face 153 circumferentially spaced from the aft end face 152 of the groove to define the maximally popped-up position of the transfer assembly as shown in FIG. 5B. Thus, the aft and forward end faces 152, 153 of the groove act as stops limiting the angular pivot range of the transfer assembly 140. The circumferential extents of the groove 148 and the tab 142 determine the angular pivot range. The transfer assembly 140 is also shown with tabs 154, 155 like those 96, 97 in the transfer assembly of FIG. 3A. So the transfer assembly 140 of FIGS. 5A and 5B is adaptable for use with either the grooved shaft 146 or the fixed plate 64 to limit the angular pivot range. Of course, another version without the depending tabs 154, 155 is also possible.

Figure 6:
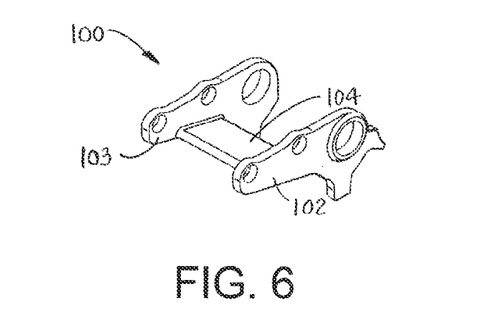
FIG. 6 is an isometric view of one version of a roller carrier usable in a transfer assembly as in FIG. 2.

A monolithic carrier 100 is shown in FIG. 6 with rollers and connecting pins removed for clarity. The monolithic carrier 100 has facing side rails 102, 103 connected by an integral connecting member 104, or cross beam, in the form of a flat strip. The monolithic carrier is molded or machined as a single piece.

Figure 7:
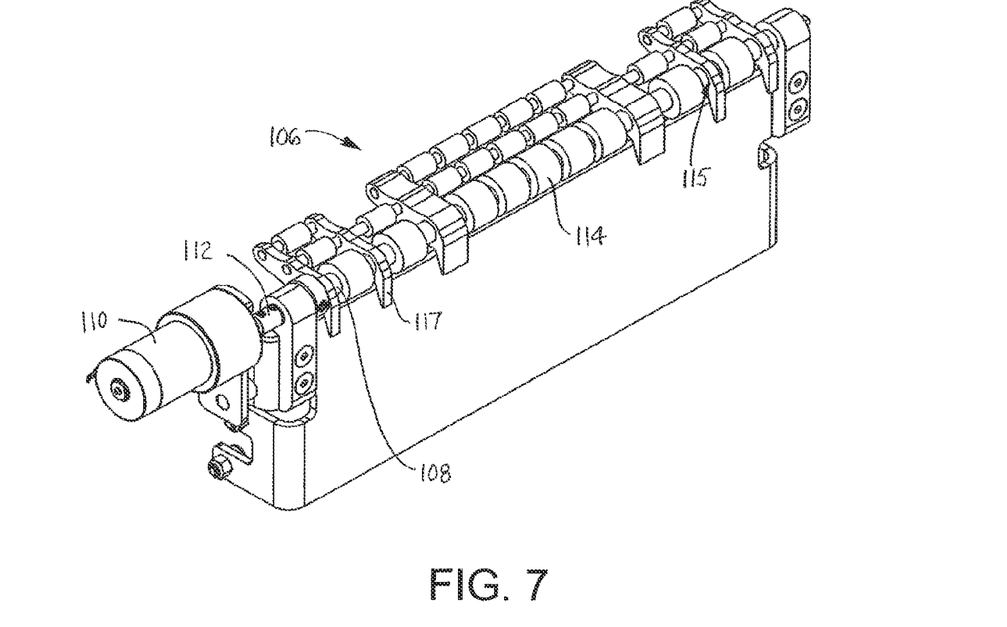
FIG. 7 is an isometric view of another version of a pop-up transfer assembly usable in a conveyor system as in FIG. 1, including a motor-driven pivot shaft.

Another version of a transfer assembly is shown in FIG. 7. The transfer assembly 106 shown is identical to that of FIG. 2, except that the pivot shaft 108 is not passive, but driven. A motor 110 coupled to the shaft 108 by a coupling 112 rotates the large rollers 114, which are snugly received on the shaft, such as by a press fit. The driven large rollers 114 help transfer articles over the transfer assembly 106 and are especially useful in preventing articles from being stranded on the transfer assembly when the feeding conveyor is halted. The bores 115 through the side rails 117 are large enough to allow the carrier to pivot freely about the pivot shaft 108.

Figure 8A:
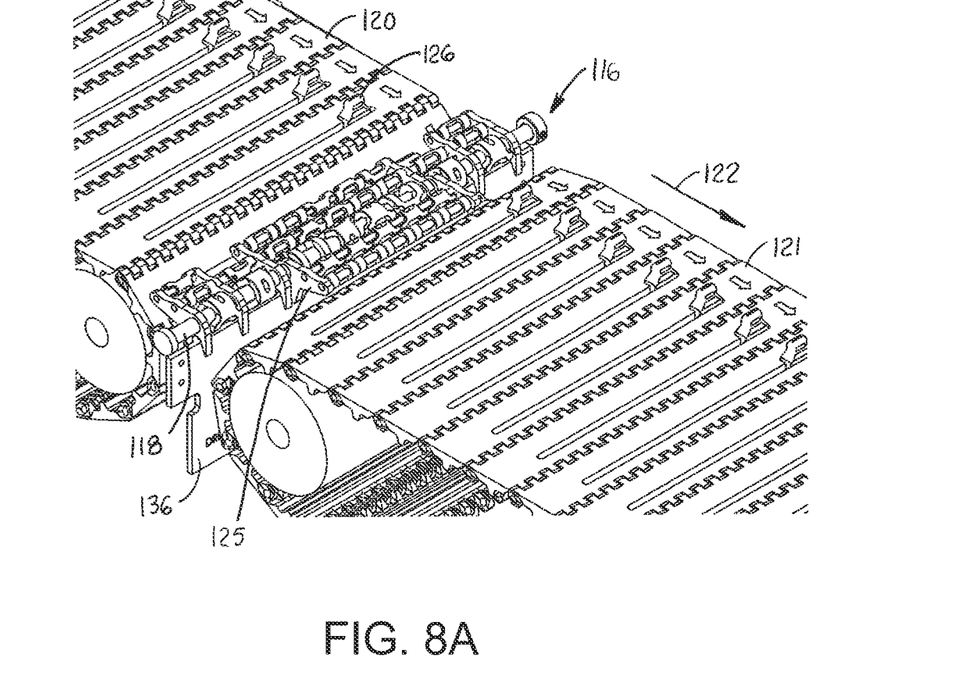
FIGS. 8A and 8B are isometric and side elevation views of a bilateral transfer assembly between two conveyors.
Figure 8B:
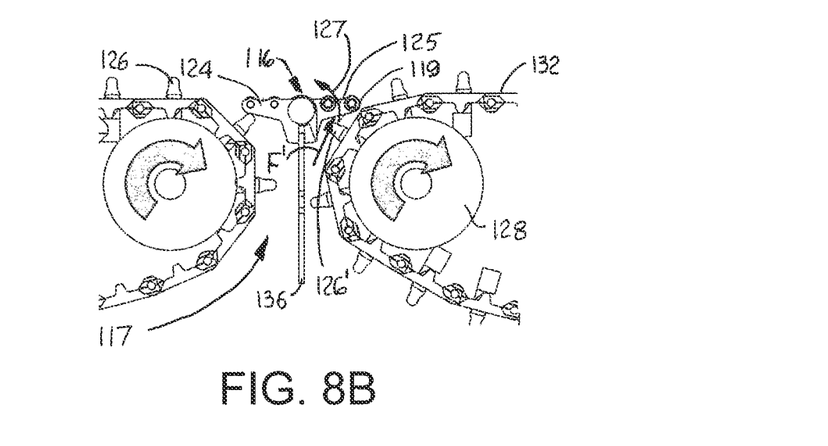

A bilateral transfer assembly 116 is shown in FIGS. 8A and 8B. The transfer assembly 116 has oppositely directed carriers pivotally attached to a pivot shaft 118. The bilateral transfer assembly 116 is positioned in a space 117 between the exit end of an upstream conveyor belt 120 and the entrance end of a downstream conveyor belt 121 both advancing in the same conveying direction 122. An upstream portion 124 of the bilateral transfer assembly 116 is shown in this example as the same as the unilateral transfer assembly 44 of FIG. 2. The upstream portion 124 and a downstream portion 125 are disposed back to back on the pivot shaft 118 with the distal ends of each distal tip 119 of the downstream portion 125 extending away from the pivot portion of the upstream portion 124. The downstream portion 125 is similar, but is shown having fewer rollers and carriers than the upstream portion 124 has. But, depending on the application, the downstream portion 125 could have the same number of or more carriers and rollers. The upstream portion 124 cooperates with the upstream belt 120 and its protrusions 126 as described for the unilateral transfer assembly 44 in reference to FIGS. 4A-4C. The downstream portion 125 of the bilateral transfer assembly 116 pivots counterclockwise 127 in FIG. 8B about the pivot shaft 118 when struck from below by a protrusion 126' rounding a reversing element, such as an idle sprocket set 128. An upward force F' from the protrusion 126' pops the downstream portion up away from the downstream conveyor belt 132. After the popped-up downstream portion 125 is cleared by the protrusion 126', gravity pivots the downstream portion of the transfer assembly back into its home position in line with the top conveying surface 132 of the downstream conveyor belt. Like the upstream portion 124, the downstream portion 125 has tab stop faces that cooperate with a stationary stop 136 affixed to the conveyor frame to limit the pivot range of the carriers.

Although the invention has been described in some detail with respect to exemplary versions, other versions are possible. For example, the pop-up transfer assembly can be made without the large rollers, or the small rollers, or any rollers at all. The transfer assembly can have a flat top surface that pivots up when hit by belt protrusions. As another example, the rollers can be cylindrical without openings from the peripheries to their bores. Or the rollers can be helical in shape with plenty of open area to the bore for cleaning the rollers, shafts, and connecting pins. So, as these few examples suggest, the claims are not meant to be limited to the details of the described versions.

What is claimed is:

1. A transfer assembly for transferring articles off the end of a conveyor, the transfer assembly comprising:
   a first side rail and a second side rail, wherein each side rail includes:
      a pivot portion having a bore;
      a finger extending from the pivot portion to a distal tip;
   wherein the bores through the first and second side rails are aligned along a pivot axis;
   a shaft received in the aligned bores about which the first and second side rails are freely pivotable over an angular pivot range;
   a connecting member connected between the first and second side rails so that the first and second side rails pivot together about the pivot axis;
   wherein the connecting member comprises at least one connecting pin connected between the fingers of the first and second side rails parallel to the pivot axis and wherein the transfer assembly further comprises at least one first roller mounted for free rotation on the at least one connecting pin.

2. A transfer assembly as in claim 1 wherein the shaft has a diameter less than the diameter of the bores.

3. A transfer assembly as in claim 1 further comprising at least one second roller mounted on the shaft for rotation about the pivot axis.

4. A transfer assembly as in claim 3 further comprising a motor coupled to the shaft to rotate the shaft and the at least one second roller.

5. A transfer assembly as in claim 1 wherein the connecting member is disposed proximate the distal tips of the fingers.

6. A transfer assembly as in claim 1 further comprising at least one second roller mounted on the shaft for rotation about the pivot axis and wherein the diameter of the at least one second roller is greater than the diameter of the at least one first roller and wherein the at least one first roller and the at least one second roller have a common tangent plane.

7. A transfer assembly as in claim 6 wherein the at least one first roller and the at least one second roller have outer peripheries encircling central bores and openings extending through the outer peripheries to the central bores.

8. A transfer assembly as in claim 6 wherein the at least one second roller is freely rotatable on the shaft.

9. A transfer assembly as in claim 6 wherein the at least one first roller and the at least one second roller are helical.

10. A transfer assembly as in claim 1 wherein the tips of the first and second side rails are curved.

11. A transfer assembly as in claim 1 wherein the first and second side rails each include first and second stop faces limiting the angular pivot range of the transfer assembly about the pivot axis.

12. A transfer assembly as in claim 11 wherein the first stop face is formed on a first tab extending from the pivot portion and the second stop face is formed on a second tab extending from the pivot portion.

13. A transfer assembly as in claim 11 further comprising a shaft having a groove received in the bores of the first and second side rails, wherein the first stop face and the second face are spaced apart on a tab extending from the pivot portion into the bore and into the groove in the shaft.

14. A transfer assembly for transferring articles off the end of a conveyor, the transfer assembly comprising:
   a first pivot portion having a bore;
   a first cantilevered portion extending from the first pivot portion to a distal tip;
   a shaft extending through the bore and having a diameter less than the diameter of the bore and defining a pivot axis about which the first pivot portion and the first cantilevered portion are freely pivotable away from a home position when the tip is subjected to an upward force and back to the home position by gravity when the tip is not subjected to an upward force;
   first and second stop faces limiting an angular pivot range of the transfer assembly about the pivot axis.

15. A transfer assembly as in claim 14 wherein the first cantilevered portion includes a plurality of pins extending parallel to the pivot axis and a plurality of first rollers rotatably mounted on the pins.

16. A transfer assembly as in claim 15 further comprising a plurality of second rollers mounted on the shaft.

17. A transfer assembly as in claim 15 wherein the plurality of first rollers are arranged in a first row proximate the distal tip of the first cantilevered portion and a second row between the first row and the shaft, wherein the rows are parallel to the pivot axis.

18. A transfer assembly as in claim 17 wherein the first row is interrupted by one or more spaces formed between the distal tip of the first cantilevered portion and the second row of first rollers.

19. A transfer assembly as in claim 15 further comprising a plurality of second rollers mounted on the shaft wherein the diameter of the second rollers is greater than the diameter of the first rollers and the first rollers and the second rollers have a common tangent plane.

20. A transfer assembly as in claim 14 wherein the first and second stop faces extend from the first pivot portion.

21. A transfer assembly as in claim 14 further comprising:
a second pivot portion having a bore;
a second cantilevered portion extending from the second pivot portion away from the first pivot portion to a distal tip;
wherein the shaft extends through the bore of the second pivot portion so that the second pivot portion and the second cantilevered portion can pivot freely about the shaft.

22. A conveyor system comprising:
an endless first conveyor belt advancing in a conveying direction along an upper carryway and rounding a reversing element along a reversing path at an exit end of the first conveyor belt into a lower return path, wherein the first conveyor belt has an outer conveying side with protrusions extending outward of the outer conveying side;
a transfer assembly disposed at the exit end of the first conveyor belt to receive articles exiting the conveyor belt, the transfer assembly including:
a pivot portion having a bore;
a cantilevered portion extending from the pivot portion over the reversing element to a distal tip;
a shaft extending through the bore and defining a pivot axis perpendicular to the conveying direction about which the pivot portion and the cantilevered portion are pivotable away from the first conveyor belt by contact with the protrusions on the reversing path and back toward the first conveyor belt by gravity when not in contact with the protrusions;
first and second stop faces limiting the angular pivot range of the transfer assembly about the pivot axis.

23. A conveyor system as in claim 22 wherein the transfer assembly comprises at least one row of first rollers extending parallel to the pivot axis in the cantilevered portion.

24. A conveyor system as in claim 23 wherein the transfer assembly comprises a plurality of second rollers rotatably mounted on the shaft.

25. A conveyor system as in claim 24 wherein the diameter of the second rollers is greater than the diameter of the first rollers.

26. A conveyor system as in claim 22 further comprising a fixed stop and wherein the first stop face is formed on a first tab extending from the pivot portion and wherein the second stop face is formed on a second tab extending from the pivot portion, wherein the first stop face and the second stop face define a space between the first and second tabs that receives the stop so that the first stop face contacts the stop at one end of the angular pivot range and the second stop face contacts the stop at the other end of the angular pivot range.

27. A conveyor system as in claim 22 wherein the shaft has a groove and wherein the first and second stop faces are formed on a tab extending from the pivot portion into the bore and into the groove in the shaft, wherein the first stop face contacts a first end of the groove at one end of the angular pivot range and the second stop face contacts an opposite second end of the groove at the other end of the angular pivot range.

28. A conveyor system as in claim 22 further comprising an endless second conveyor belt advancing in the conveying direction along an upper carryway and rounding a second reversing element along a reversing path at an entrance end of the second conveyor belt from a lower return path, wherein the second conveyor belt has an outer conveying side with protrusions extending outward of the outer conveying side; and wherein the transfer assembly is disposed between the exit end of the first conveyor belt and the entrance end of the second conveyor belt and further includes a second pivot portion freely pivotable about the shaft and a second cantilevered portion extending from the second pivot portion over the second reversing element to a distal tip.

* * * * *